A. BLEILE.
DEVICE FOR FEEDING CAKES AND THE LIKE.
APPLICATION FILED DEC. 6, 1917.
1,272,608.
Patented July 16, 1918.
3 SHEETS—SHEET 1.
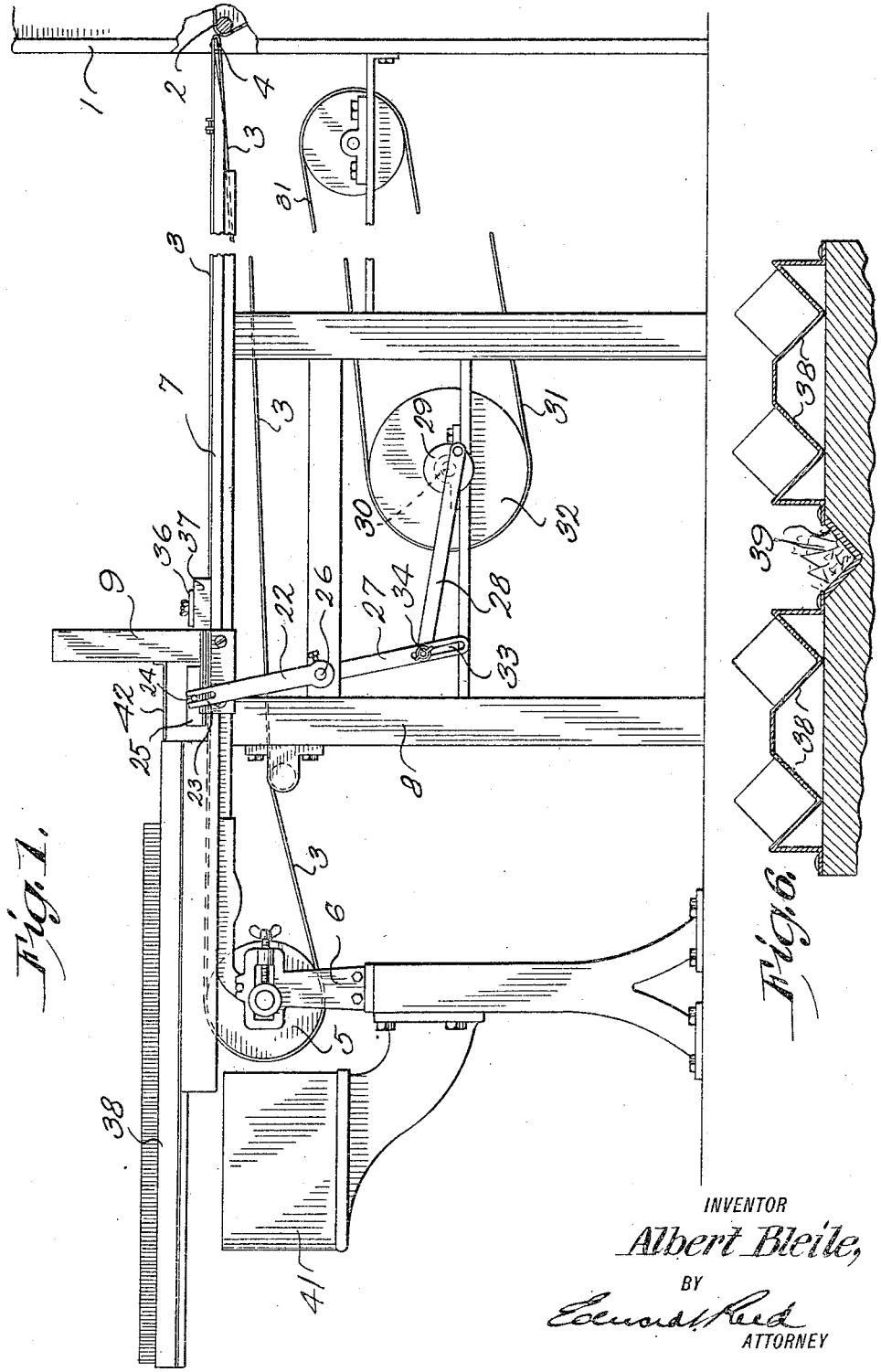
INVENTOR
Albert Bleile,
BY
Edward Reed
ATTORNEY

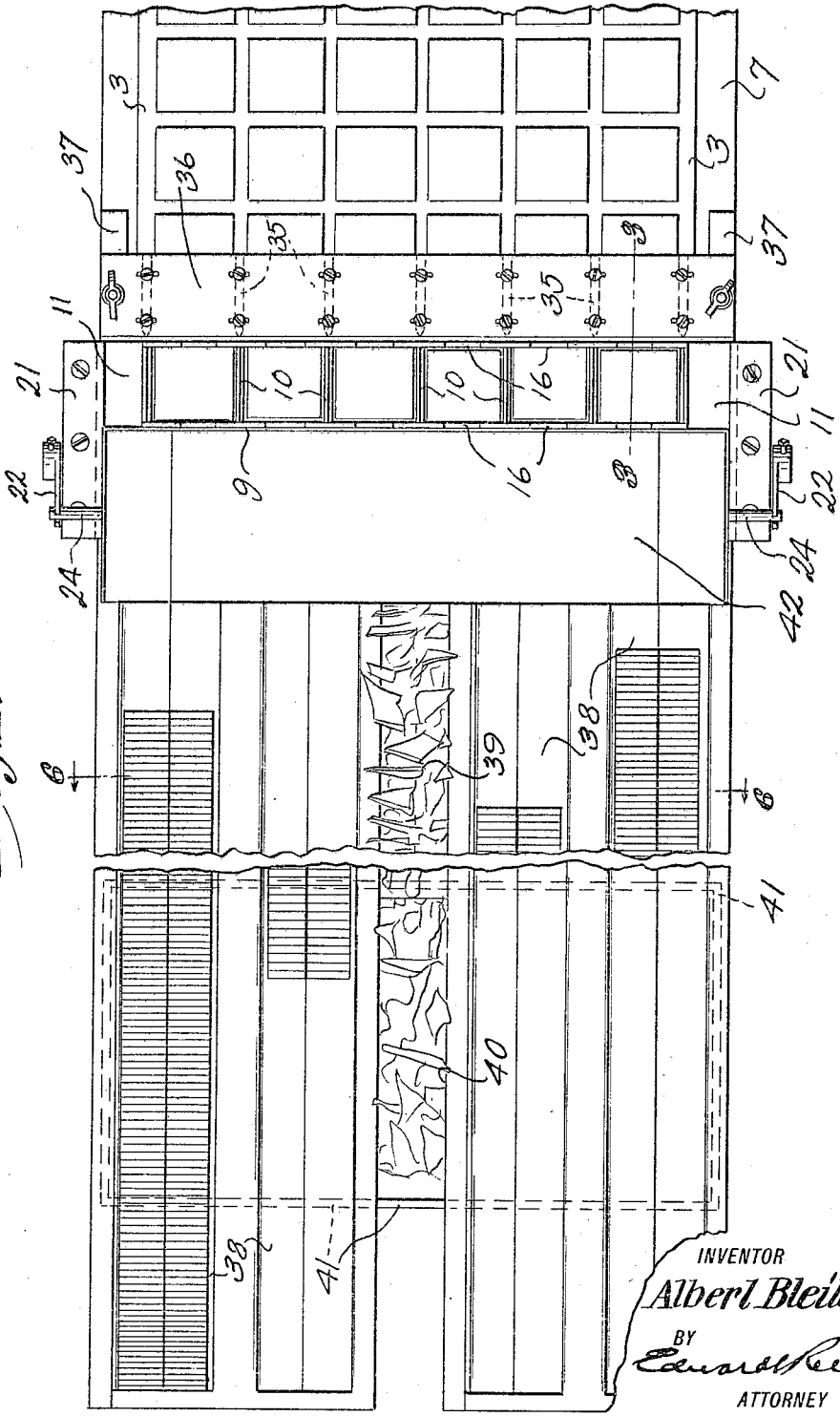

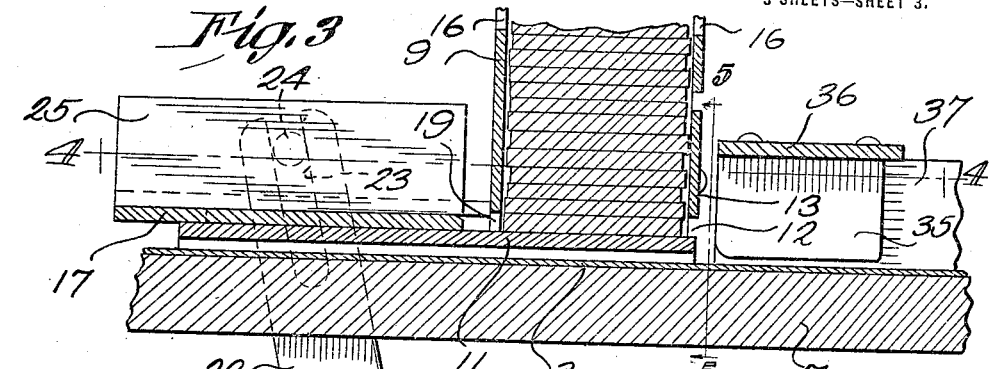
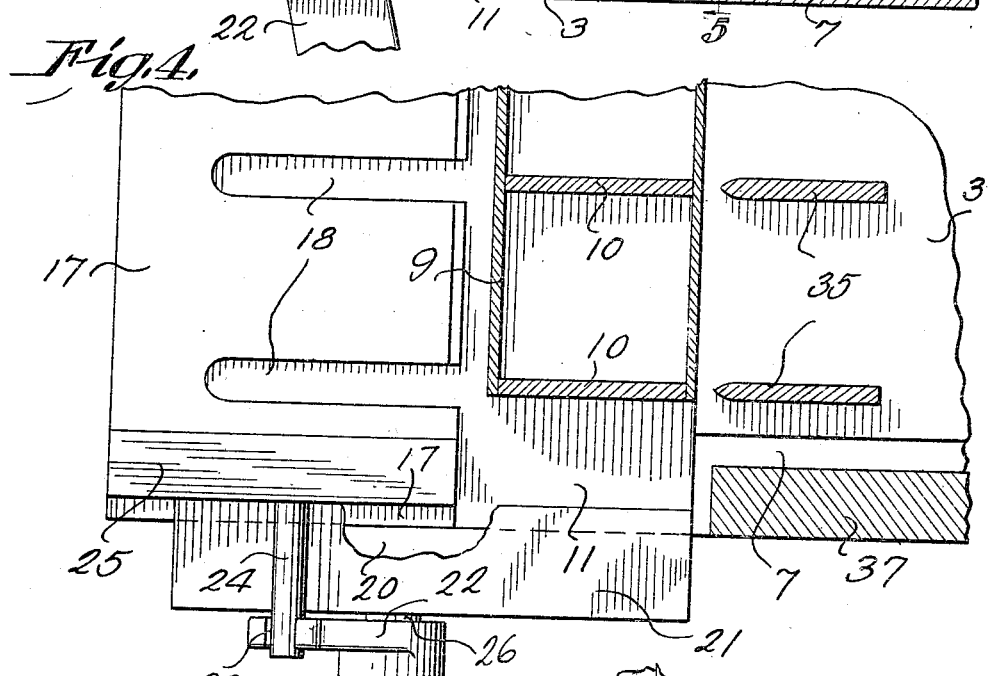
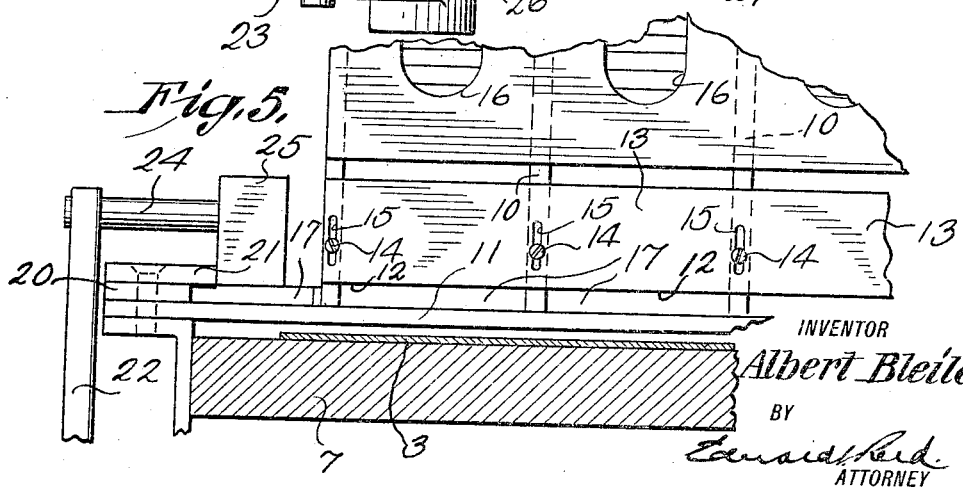

UNITED STATES PATENT OFFICE.

ALBERT BLEILE, OF DAYTON, OHIO.

DEVICE FOR FEEDING CAKES AND THE LIKE.

1,272,608.

Specification of Letters Patent. Patented July 16, 1918.

Application filed December 6, 1917. Serial No. 205,796.

*To all whom it may concern:*

Be it known that I, ALBERT BLEILE, a citizen of the United States, residing at Dayton, in the county of Montgomery and State of Ohio, have invented certain new and useful Improvements in Devices for Feeding Cakes and the like, of which the following is a specification, reference being had therein to the accompanying drawing.

This invention relates to a device for feeding cakes and the like, and is designed more particularly for feeding cakes to a machine in which they are to be coated with chocolate, or the like. It is customary in coating machines of this character to employ a feed belt on which cakes are arranged for delivery to the coating apparatus. Heretofore the cakes have been placed upon the belt by hand, each cake being handled and placed into position individually. Not only is this method slow, and consequently expensive, but it is practically impossible to arrange the cakes with such regularity as to utilize to the fullest extent the surface of the feed belt, and consequently the output of the coating machine is correspondingly reduced.

The object of the present invention is to provide a mechanism which will mechanically deliver the cakes to the feed belt and will so place them thereon as to utilize fully the belt surface, and will handle the cakes without breaking or injuring them.

A further object of the invention is to provide a device of this kind which can be used in connection with feed belts for coating machine as they are at present constructed; and further to provide such a device which will be very simple in its construction and operation.

It is also an object of the invention to provide a device of this kind which will handle cakes of different sizes and different shapes.

It is also an object of the invention to provide, in connection with a feeding mechanism of this character, racks in which the cakes can be quickly and easily arranged for insertion in the feeding device.

In the accompanying drawings Figure 1 is a side elevation, partly broken away, of a mechanism embodying my invention; Fig. 2 is a plan view, partly broken away, of such a mechanism; Fig. 3 is a longitudinal sectional view taken on the line 3—3 of Fig. 2; Fig. 4 is a horizontal sectional view taken on the line 4—4 of Fig. 3; Fig. 5 is a transverse sectional view taken on the line 5—5 of Fig. 3 looking in the direction of the arrows; and Fig. 6 is a transverse sectional view taken on the line 6—6 of Fig. 2.

In these drawings I have illustrated one embodiment of my invention and have shown the same as applied to a feed belt of a machine for coating cakes with chocolate, but it will be understood that the invention is applicable to machines of other kinds, and may be used for delivering cakes, confections, or the like, whether edible or not, to conveyers of different kinds.

In these drawings I have shown a portion of the coating machine at 1. This machine comprises in itself a conveyer 2 to which the cakes are delivered by a conveyer 3, which preferably comprises an endless belt. As here shown this belt extends about a narrow guide, such as the guide-bar 4, arranged close to the adjacent end of the conveyer 2 within the coating machine, so that the cakes will pass from the one conveyer to the other. The conveyer 3 is supported at its opposite end by a drum 5 journaled in suitable supporting brackets 6, and which serves to impart movement to the belt. The drum may be driven in the usual, or any suitable, manner and it is not necessary to here illustrate or describe the driving connections. The upper stretch of the belt passes over and preferably rests upon the top 7 of a suitable supporting structure, such as a table 8.

In order to mechanically feed the cakes to the conveyer belt 3 I have mounted adjacent to the conveyer suitable feeding mechanism, which, as here shown, comprises a cake supporting structure 9, which is in the form of a housing extending transversely to the belt and divided by a plurality of vertical partitions 10 into a series of compartments, each of which is adapted to receive a pile of superimposed cakes, as shown in Fig. 3. The lowermost cake of each pile rests upon the bottom plate 11 of the structure, and the front wall of the structure is provided adjacent to each compartment with a discharge opening 12, through which the cakes may be discharged one at a time. In the present construction this discharge opening is adjustable to accommodate the same to cakes of different thicknesses; and as here shown the front wall of the supporting structure, or housing, is formed in two parts, the lower part 13 being adjustably secured to the structure, as by means of screws 14 extending through slots 15 in the adjustable plate and screwed into the respective partitions 10 and into the end walls of the housing. In the present instance I have employed a single adjustable plate for controlling the discharge openings for the several compartments, but obviously this plate can be made in one or more parts. In order to facilitate the insertion of the cakes into the compartments I prefer to provide the front and rear walls of each compartment with a vertical slot 16 extending from the top of the wall to points a short distance above the bottom wall 11. In inserting the cakes into the compartments a stack of cakes properly alined is lifted by the operator and supported upon the finger, or fingers, and the finger is then inserted in the slot of the compartment, and in this manner the cakes can be supported by the finger until they have been lowered to a point near the bottom of the compartment where they may be released and allowed to drop to the bottom, if the compartment is empty, without danger of their turning or being disarranged in the compartment. A suitable ejector is provided for discharging cakes from the several compartments through the discharge openings 12, and in that form of the device here shown this ejector comprises a plate 17 slidably mounted upon the bottom 11 of the cake supporting structure, which is extended rearwardly beyond the structure to receive the same. This plate is slotted, as shown at 18, to provide between the slots narrow portions, or fingers, which will enter the respective compartments, the rear wall of the supporting structure being provided at its lower edge with openings 19 to permit the passage of the ejector. The forward edge of the ejector plate is of such thickness that it will engage the rear edge of the lowermost cake of the pile of cakes in each compartment, without passing beneath the same, and will move this cake from beneath the pile and through the discharge opening 12. Inasmuch as a portion of the ejector plate enters each compartment upon each operation of the ejector it will be obvious that a cake will be discharged from each compartment upon each operation. The ejector may be mounted and operated in any suitable manner. As here shown it is mounted in a guide-way formed between guide strips 20 arranged at the opposite sides of the bottom plate 11, which forms the bottom of the guide-way, and the ejector plate is retained in this guide-way by means of retaining strips, or flanges, 21, which are secured to the guide strips 20 and overhang the adjacent edges of the ejector plate. In the present construction the ejector plate is actuated by means of rock arms 22 which are slotted at their upper ends, as shown at 23, to receive pins 24 extending laterally from the ejector plate, and in the present instance connected therewith by means of blocks 25 which are secured to the top surface of the plate and extend above the retaining strips, or flanges, 21. The rock arms 22 are rigidly secured to a shaft 26 journaled on the table 8 and having a downwardly extending arm 27 which is connected by a pitman 28 with a crank wheel 29 carried by a shaft 30 which is also journaled on the frame of the table 8 and is driven from a suitable part of the mechanism, the driving in the present instance being accomplished by a belt 31 passing about a belt pulley 32 on the shaft 30. The connection between the pitman and the arm 27 is preferably an adjustable one to permit the amount of movement imparted to the ejector plate to be regulated, and in the present instance the connection is formed by slotting the lower end of the arm 27, as shown at 33, to receive a bolt 34 secured to the pitman 28.

It will be apparent that reciprocatory movement may be imparted to the ejector plate at such speed as may be desired, and that each reciprocation of the plate will cause a series of cakes to be discharged from the respective compartments onto the conveyer. The speed at which the ejector is operated is so timed relatively to the speed of movement of the feed belt 3, as to cause the cakes to be spaced apart on the belt the desired distance. The bottom plate 11 of the cake supporting housing is, of course, supported above and preferably out of engagement with the feed belt 3, consequently the cakes must drop downward as they are discharged from the respective compartments. To correct any tendency of the cakes to turn as they fall and engage the belt, I have arranged above the belt and in front of the cake supporting housing a series of guide fingers 35, which are arranged in alinement with the respective partitions 10 of the housing, and may have their rear edges tapered, as shown in Fig. 4. These fingers are preferably supported out of engagement with the feed belt but in such relation thereto that the cakes cannot pass between the lower edges thereof and the belt. While the fingers may be supported in various manners, I prefer to mount them so that they can be readily removed to permit access to be had to the openings of the plate 13, and I have here shown them as carried by a bar 36 extending transversely to the belt and removably secured to supporting blocks 37 mounted on the respective edges of the table.

In order that the operator, or operators, may quickly arrange the cakes with their edges in alinement and lift the same in bunches for insertion into the several compartments, I have provided in the rear of the feeding device a plurality of longitudinally extending V-shaped troughs 38, which are preferably formed of sheet metal and are of such size and shape that when the cakes are dropped into the same on edge they will move of their own accord into proper alinement. In the operation of the device the cakes are brought to the feeding mechanism in trays and are lifted from the trays and arranged on edge in the several troughs, or stackers, 38, and are pushed forward toward the feeding device. They are then lifted from the troughs by the operator who inserts them in the compartments. There is necessarily more or less breakage and waste in the handling of the cakes, and to readily dispose of this waste I have arranged between two of the troughs 38 a chute 39, which extends rearwardly for a portion of the length of the trough section and communicates with an opening 40 beneath which is arranged a suitable receptacle 41, into which the waste drops. The troughs 38 terminate in the rear of the guide-way for the ejector, and in order that the crumbs and the broken pieces of the cake may not enter this guide-way and thus interfere with the operation of the ejector I have arranged above the guide-way a tray 42 which is readily removable to permit it to be emptied.

The operation of the device will be readily understood from the foregoing description, and it will be apparent that I have provided a device of a very simple construction and operation, which will feed cakes onto the conveyer belt as rapidly as is required to cause the belt to be completely filled, and the cakes spaced apart to provide the proper clearance between them. The device is adjustable to accommodate it to cakes of different sizes and it can be used with cakes of different shapes as it is not essential that the cakes should fit snugly within the compartments of the housing.

While I have shown and described one embodiment of my invention I wish it to be understood that I do not desire to be limited to the details of construction as various modifications will occur to a person skilled in the art.

Having now fully described my invention, what I claim as new and desire to secure by Letters Patent, is:—

1. In a device of the character described, a supporting structure, a conveyer movable over said structure, a housing mounted above said conveyer and extending transversely thereof, said housing comprising a bottom plate and a series of compartments extending upwardly therefrom and each adapted to receive a stack of superimposed cakes, and each having a discharge opening near one edge of said bottom plate, an ejector arranged on that side of said housing opposite said discharge openings and having parts adapted to enter the respective compartments to discharge the lowermost cakes therefrom onto said conveyer, means for actuating said ejector, and a series of fingers supported above said conveyer adjacent to the discharge openings for said compartments and arranged in planes extending between the respective compartments of said housing, whereby the cakes discharged from said openings will be held against turning movement.

2. In a device of the character described, a supporting structure, a conveyer movable over said structure, a housing mounted above said conveyer and extending transversely thereof, said housing comprising a bottom plate and a series of compartments extending upwardly therefrom and each adapted to receive a stack of superimposed cakes, and each having a discharge opening near one edge of said bottom plate, an ejector arranged on that side of said housing opposite said discharge openings and having parts adapted to enter the respective compartments to discharge the lowermost cakes therefrom onto said conveyer, means for actuating said ejector, a bar mounted on said structure adjacent to the discharge side of said housing and extending transversely of said conveyer above the same, a series of fingers carried by said bar and depending therefrom in planes extending between the respective compartments of said housing, said fingers being supported with their lower edges out of engagement with said conveyer.

3. In a device of the character described, a conveyer, a structure arranged above said conveyer comprising a plurality of compartments each adapted to receive a pile of cakes, an ejector having parts adapted to engage the cakes therein and discharge the same onto said conveyer, a stacking device arranged in the rear of said structure beyond said ejector, and a removable tray interposed between said stacking device and said structure above said ejector.

4. In a device of the character described, a conveyer, a structure arranged above said conveyer and comprising a plurality of compartments each adapted to receive a pile of cakes, an ejector having parts adapted to engage the cakes therein and discharge the same onto said conveyer, a stacking device arranged in the rear of said structure beyond said ejector, and a guard interposed between said stacking device and said structure to prevent crumbs and the like from falling on said ejector.

In testimony whereof, I affix my signature hereto.

ALBERT BLEILE.